Oct. 13, 1931.     R. T. POLLOCK     1,827,106
VAPOR CHAMBER
Original Filed April 11, 1921
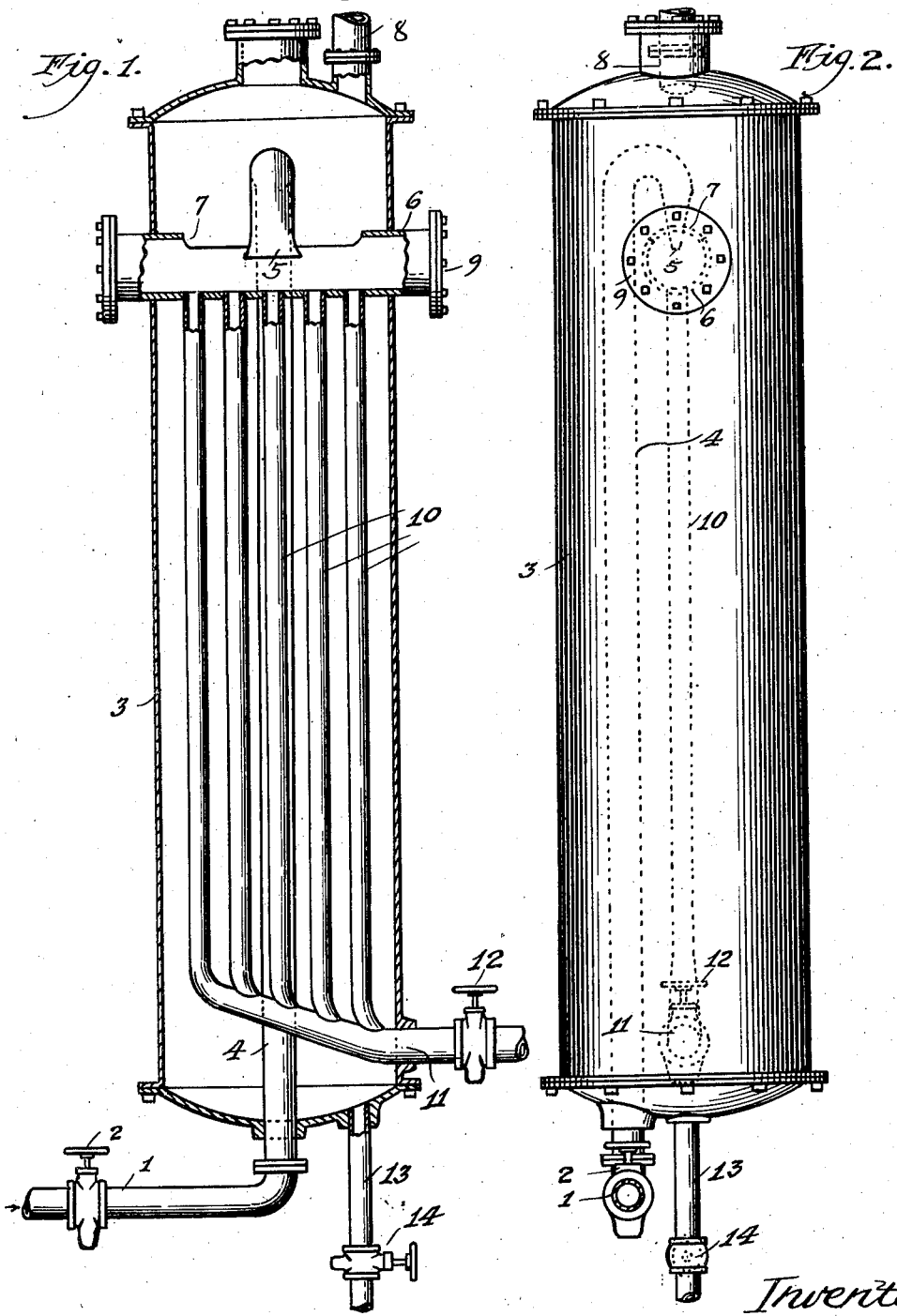
Witness,
S. S. Mann
Inventor,
Robert T. Pollock.
By Frank L. Belknap, Atty.

Patented Oct. 13, 1931

1,827,106

UNITED STATES PATENT OFFICE

ROBERT T. POLLOCK, OF BOSTON, MASSACHUSETTS, ASSIGNOR TO UNIVERSAL OIL PRODUCTS COMPANY, OF CHICAGO, ILLINOIS, A CORPORATION OF SOUTH DAKOTA

VAPOR CHAMBER

Application filed April 11, 1921, Serial No. 460,526. Renewed October 15, 1929.

This invention relates to improvements in vapor chambers and refers more particularly to a vaporizing chamber adapted to be used in connection with oil cracking apparatuses.

Among the salient objects of the invention are to provide a vaporizing chamber in which the heated oil is introduced into an enlarged compartment where the released vapors are directed off through vaporizing lines and the residual or unvaporized portion is concentrated in narrow vertical tubes and passed directly to a drawoff line, thereby obviating to a marked degree the accumulation of precipitated carbon within the chamber.

In the drawings:

Fig. 1 is a sectional view of the chamber.

Fig. 2 is a view of the chamber in which the manifold with its connecting drawoff lines is shown in end elevation.

In cracking hydrocarbon oil, after the oil has been heated to a cracking temperature in a heating zone and passed to a vaporizing chamber to permit the oil vapors to rise from the oil body, the carbon deposition which accompanies this vaporization of the oil is an objectionable feature in that it collects in the sides of the vapor chambers in considerable quantities and causes difficulties in that it plugs the drawoff residuum line and also insulates the oil body from the chamber in a manner to retard to a considerable extent the cracking reaction.

The vaporizing chamber shown in the drawings is connected into a cracking system, the line 1 controlled by the valve 2 being direct connected to the transfer line from the heating coils or other type of heating means which is used. The oil after being heated to a cracking temperature is directed through the line 1 and rises into the shell 3 of the vaporizing chamber through a vertical pipe 4, the upper end of which has a turned-down portion 5, which is formed to cause the oil to be sprayed into the upper manifold pipe 6 through the open or cut-away portion 7 in the upper surface of the manifold pipe. This spray or nozzle 5 is of a character that the oil is sprayed into the manifold in a finely divided condition and the vapors which are released from the oil body as it is introduced to the vaporizing chamber rise and are drawn off through vapor line 8, and broken off portion, which is shown in the drawings. The vapors passing through this vapor line are directed to condensing and collecting apparatus (not shown). The manifold 6 is fitted with removable end plates 9 which may be taken off when the apparatus is to be cleaned. Direct-connected to the manifold 6 in its lower surface are swedged or otherwise tightly fitted the vertical drawoff pipes 10, which unite near the bottom of the vaporizing chamber, to form a single drawoff line 11, which is controlled by a valve 12 interposed therein. Any condensate which may collect in the chamber may be drawn off through the drain or reflux line 13 regulated by a valve 14 and may be returned to the raw oil charging line to be treated again in the heating zone or may be conducted to storage as desired. It has been found by producing a direct and continuous flow of considerable velocity through the residuum discharge line that the objectionable accumulation of carbonaceous matter in the vaporizing chamber can be practically eliminated.

By introducing the oil into the top of the vapor chamber through the spray nozzle 5 and there permitting the vaporized portion to pass off through the vapor line 8 and at the same time, directing the residual products, together with the higher boiling point fractions through a plurality of vertically arranged drain tubes which unite to form a single drawoff line, the gravity flow is sufficient at all times to keep the residuum line free from any carbon accumulation. In addition to this, by enclosing these vertical drain lines in a vaporizing shell as shown, the heat of the residuum is concentrated and the heat may be utilized in further distillation of a certain portion of relatively high boiling point oils which will be condensed from the vapors and collect in the vapor chamber about the vertically positioned drain tubes. The utilization of heat in this residuum product is of importance as a very substantial amount of redistillation will take place in the shell of the vaporizing chamber about these vertical tubes.

I claim as my invention:

1. In a vaporizing chamber, the combination with a plurality of tubes communicating with an open liquid receptacle, located at least in part within the upper part of said vapor chamber, the part exterior thereof being closed, means for introducing the liquid to be vaporized to the liquid receptacle, and means for removing the vaporized portion from the chamber simultaneously with the drawing off of the unvaporized portion through the tubes.

2. In a vaporizing chamber, the combination with a plurality of drain tubes communicating with an open receptacle, located at least in part in the chamber, the part exterior thereof being closed, said tubes extending longitudinally of the chamber and uniting to form a single drain line, of a means for spraying heated liquid into said open receptacle, means for removing the vaporized portions from the said open receptacle and vapor chamber, and means for draining the unvaporized portion from the receptacle through the tubes, the heated liquid in said drain tubes constituting means for distillation of the liquid body of oil maintained about the tubes.

3. In a vertical vapor and liquid separating chamber, the combination of a receptacle disposed in the upper portion of said chamber, said receptacle having an open upper portion, means for introducing liquid to said receptacle, drain pipes extending downwardly from the lower portion of said receptacle through the interior of said chamber, means for passing liquid from the lower portions of said pipes to the exterior of said chamber, and a vapor outlet in the upper portion of said chamber.

ROBERT T. POLLOCK.